May 28, 1957     D. BENLON     2,793,578

CULTIVATOR

Filed March 4, 1954

INVENTOR.
Dewey Benlon
BY
ATTORNEY.

United States Patent Office 2,793,578
Patented May 28, 1957

2,793,578
CULTIVATOR

Dewey Benlon, Kansas City, Kans.

Application March 4, 1954, Serial No. 413,996

1 Claim. (Cl. 97—59)

This invention has to do with soil tillage implements and particularly to a hand cultivator especially adapted for use in the garden, and has for its primary object the provision of a mobile frame carrying a scarifier blade in a manner to permit skimming of the soil to not only destroy weeds and other undesired growth, but to effectively loosen and stir the ground between and around garden crops and the like.

It is the most important object of the present invention to provide a skim cultivator having a triangular frame provided with a handle bar on one end thereof and a ground-engaging wheel at its opposite end for supporting a scarifier blade through the medium of shanks depending from the frame and adapted to hold the blade longitudinally horizontal in transverse relationship to the normal path of travel of the cultivator and transversely inclined sloping upwardly as the rearmost end of the implement is approached.

Other objects include important details of construction, all of which will be made clear as the following specification progresses, reference being had to the accompanying drawing, wherein.

Figure 1:
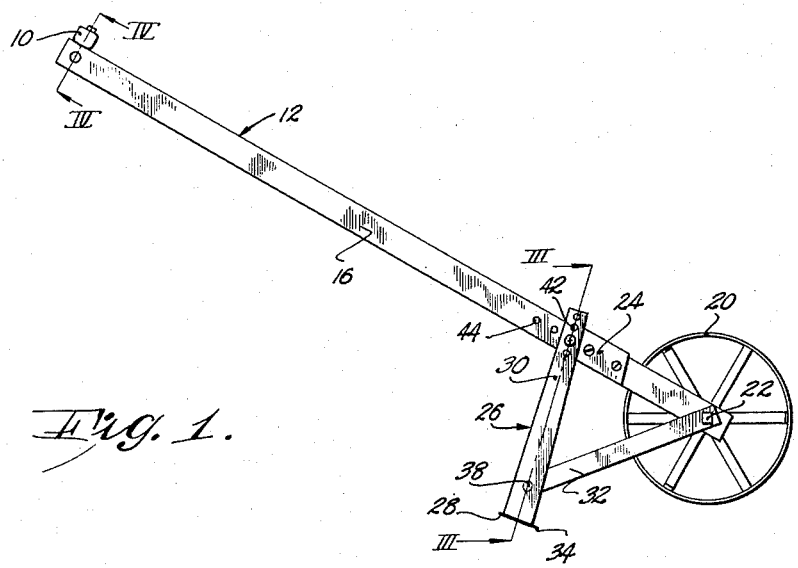
Figure 1 is a side elevational view of a cultivator made pursuant to my present invention.

The skim-type cultivator illustrated in the drawing is adapted for hand-manipulation and, therefore, includes an elongated handle bar 10 forming a part of a triangular-shaped frame broadly designated by the numeral 12.

Frame 12 includes additionally a pair of elongated beams 14 and 16 that diverge as the handle bar 10 is approached.

Figure 4:
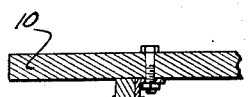
Fig. 4 is a fragmentary, detailed, cross-sectional view on an enlarged scale taken on line IV—IV of Fig. 1.

Handle bar 10 which overlies the beams 14 and 16 adjacent their rearmost ends, is affixed to the latter through the medium of L-shaped brackets 18 as best seen in Fig. 4 of the drawing.

A ground-engaging wheel 20 between the beams 14 and 16 at the apex end of the frame 12 is rotatably mounted to the beams 14 and 16 through the medium of a normally horizontal axle 22. A U-shaped brace 24 embracing the beams 14 and 16 adjacent the wheel 20, interconnects the beams 14 and 16 as is clear in Figs. 1 and 2.

There is provided a pair of V-shaped supports 26 for an elongated scarifier blade 28 disposed beneath the frame 12 and just rearwardly of the wheel 20. Each support includes an elongated shank 30 and an arm 32. Each shank 30 depends from a corresponding beam 14—16 and each of the arms 32 connects one of the shanks 30 with the axle 22.

Figure 2:
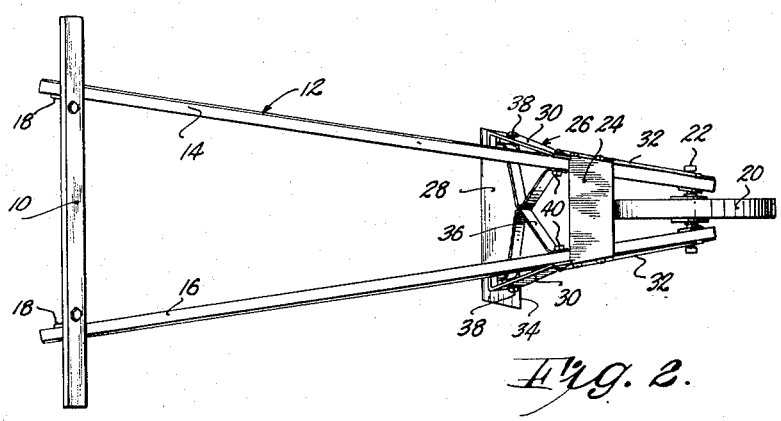
Fig. 2 is a top plan view thereof.
Figure 3:
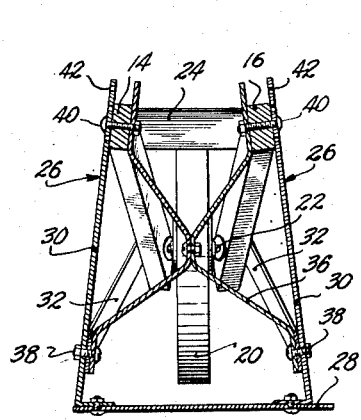
Fig. 3 is an enlarged, cross-sectional view taken on line III—III of Fig. 1.

The blade 28 is suitably joined to the shanks 30 at their lowermost ends and, while its longitudinal axis is horizontal and disposed transversely to the normal path of travel of the implement, its transverse axis is inclined, as shown in Fig. 1, sloping downwardly and forwardly as its longitudinal cutting edge 34 is approached. A cross-head 36 interconnects the shanks 30 and the frame 12 to reinforce the supports 26, it being noted that fasteners 38 interconnect the shanks 30, the arms 32 and the cross-head 36. Similarly, fasteners 40 interconnect the cross-head 36, the beams 14 and 16, and the shanks 26.

To the end that the distance between the blade 28 and the frame 12 may be varied and the angularity of the blade 28 adjusted, there are provided a plurality of holes 42 in the shanks 30 and a number of openings 44 in the beams 14 and 16 for selectively receiving the fasteners 40. As adjustments are made, arms 32 pivot freely on the fasteners 38 and the axle 22.

It is now seen that through the construction above set forth, the cultivator forming the subject matter of the present invention is easily manipulated and will effectively till the soil as it is pushed forwardly by the operator grasping the handle bar 10. Blade 28 will skim the soil and not only destroy all obnoxious growth but will loosen the ground since the angularity of the blade 28 causes the earth to pass over the blade 28 transversely thereof and to drop therebehind in a loosened, broken-up condition.

The implement is highly maneuverable and the operator may easily work in and around plants, shrubbery, flowers and the like without damage thereto and without need of following with hand tools such as hoes and other instruments.

Having thus described the invention what is claimed as new and desired to be secured by Letters Patent is:

A skim-cultivator comprising a triangular frame having a front apex end, said frame including a pair of relatively converging beams and a handle bar joining the beams at the opposite, rearmost end of the frame; a ground-engaging wheel between the beams at said apex end of the frame; an axle connecting the beams and rotatably receiving the wheel; a pair of elongated shanks having a series of spaced openings adjacent one end thereof, there being also a series of spaced openings in each of said beams rearwardly of the wheel; releasable fasteners extending through selected openings and thereby interconnecting each shank to one of the beams in depending relationship thereto; a pair of arms pivotally attached at one end thereof to the axle on either side respectively of the wheel; releasable fasteners interconnecting each arm at the opposite end thereof to the corresponding shank adjacent the lowermost end of the latter; an X-shaped crosshead between the shanks and having four outwardly divergent legs each provided with an opening receiving one of said fasteners; and an elongated, longitudinally horizontal scarifier blade joining the shanks, said blade having a forwardmost, longitudinal cutting edge disposed transversely of the normal path of travel of the cultivator, and sloping downwardly and forwardy as said cutting edge is approached, the height and angularity of said blade being adjustable by changing the position of the fasteners interconnecting the shanks and the beams.

References Cited in the file of this patent

UNITED STATES PATENTS

| 188,917 | Johnson | Mar. 27, 1877 |
| 1,094,437 | Harris | Apr. 28, 1914 |
| 1,917,333 | Simmons | July 11, 1933 |
| 2,047,498 | Thew | July 14, 1936 |
| 2,068,215 | Winters | Jan. 19, 1937 |
| 2,567,343 | Myer | Sept. 11, 1951 |

FOREIGN PATENTS

| 382,493 | Great Britain | Oct. 27, 1932 |